United States Patent
Li et al.

(10) Patent No.: US 9,824,077 B2
(45) Date of Patent: Nov. 21, 2017

(54) TEXT INFORMATION INPUT METHOD AND APPARATUS

(71) Applicant: Huawei Technologies Co., Ltd., Shenzhen, Guangdong (CN)

(72) Inventors: Pingning Li, Shanghai (CN); Hanlin Dong, Milan (IT); Yi Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 14/530,184

(22) Filed: Oct. 31, 2014

(65) Prior Publication Data

US 2015/0128177 A1    May 7, 2015

(30) Foreign Application Priority Data

Nov. 4, 2013  (CN) .......................... 2013 1 0538013

(51) Int. Cl.
*G06F 3/0484* (2013.01)
*H04N 21/422* (2011.01)
*G06F 17/24* (2006.01)

(52) U.S. Cl.
CPC .......... *G06F 17/24* (2013.01); *G06F 3/04842* (2013.01); *H04N 21/42208* (2013.01); *H04N 21/42214* (2013.01)

(58) Field of Classification Search
None
See application file for complete search history.

(56) References Cited

U.S. PATENT DOCUMENTS

| | | | | |
|---|---|---|---|---|
| 2010/0265413 | A1* | 10/2010 | Seo | H04N 5/4403 348/734 |
| 2011/0043326 | A1* | 2/2011 | Lee | H04N 7/163 340/5.8 |
| 2011/0084919 | A1* | 4/2011 | Lee | G06F 3/023 345/173 |
| 2011/0292282 | A1* | 12/2011 | Isozu | H04M 1/72533 348/563 |
| 2011/0313775 | A1* | 12/2011 | Laligand | H04N 21/23433 704/275 |
| 2012/0017241 | A1* | 1/2012 | Yeh | H04N 5/44582 725/37 |
| 2013/0061267 | A1 | 3/2013 | Cansino et al. | |

FOREIGN PATENT DOCUMENTS

| | | |
|---|---|---|
| CN | 101751762 A | 6/2010 |
| CN | 101924813 A | 12/2010 |
| CN | 101969470 A | 2/2011 |
| CN | 103024525 A | 4/2013 |
| CN | 103313140 A | 9/2013 |

\* cited by examiner

*Primary Examiner* — Michael Telan
(74) *Attorney, Agent, or Firm* — Leydig, Voit & Mayer, Ltd.

(57) ABSTRACT

Embodiments of the present application disclose a text information input method and apparatus, where the method includes: firstly, invoking a first edit box of a handheld device; afterwards, updating display content of the first edit box according to an editing operation performed by an operator on the first edit box; and then, detecting whether first display content of the first edit box at a current moment and second display content of the first edit box at a previous moment are the same, and if they are different, sending the first display content to a set top box, so that the set top box updates display content of a second edit box.

13 Claims, 17 Drawing Sheets

TEXT INFORMATION INPUT METHOD AND APPARATUS

CROSS-REFERENCE TO RELATED APPLICATION

This application claims priority to Chinese Patent Application No. 201310538013.X, filed on Nov. 4, 2013, which is hereby incorporated by reference in its entirety.

TECHNICAL FIELD

The present application relates to the field of set top box technologies, and in particular, to a text information input method and apparatus of a set top box.

BACKGROUND

Generally, a remote controller is used to control input of a set top box, and in most cases, the remote controller can meet an operation requirement of a user. However, when using the remote controller to input text information into the set top box, the user needs to move arrow keys on the remote controller to make a cursor move among 26 letters displayed by a system input method of the set top box, and select a corresponding letter for input. In addition, after a letter is selected and candidate characters appear, the user needs to move the arrow keys to select a corresponding character in a candidate area. It can be seen that in this text input manner, the arrow keys on the remote controller need to be repeatedly operated to complete text information input, which causes a complex operation and low efficiency.

SUMMARY

Embodiments of the present application provide a text information input method and apparatus, so as to improve the text information input efficiency of a set top box.

To solve the foregoing technical problem, the embodiments of the present application disclose the following technical solutions:

According to a first aspect, the present application provides a text information input method, applied to a handheld device that is used to enable a virtual input method in a set top box beforehand, where the method includes: invoking a first edit box of the handheld device; acquiring an editing operation of text editing performed by an operator on the first edit box; updating display content of the first edit box according to the editing operation, where the display content includes text information and cursor position information that are displayed in the first edit box; and detecting whether first display content of the first edit box at a current moment and second display content of the first edit box at a previous moment are the same, and if they are different, sending the first display content to the set top box, so that displayed content of a second edit box correspondingly displayed by the set top box is updated.

With reference to the first aspect, in a first possible implementation manner of the first aspect, when a display interface on a handheld device side is exactly consistent with a display interface of the set top box, the invoking a first edit box of the handheld device includes: detecting whether a cursor position of the set top box is in the second edit box, and if the cursor position is in the second edit box, sending a forward invoking input request message to the set top box, where the forward invoking input request message enables the set top box to acquire information about the second edit box, and the information about the second edit box includes text display content, the cursor position, and attribute information of the second edit box; receiving a forward invoking input response message obtained when the set top box responds to the forward invoking input request message, where the forward invoking input response message carries the information about the second edit box; and setting an attribute of the first edit box according to the information about the second edit box.

With reference to the first aspect, in a second possible implementation manner of the first aspect, the invoking a first edit box of the handheld device includes: receiving a backward invoking input request message sent by the set top box, where the backward invoking input request message is a request message generated by the set top box according to information about the second edit box after the set top box acquires the information about the second edit box when detecting that a cursor position is in the second edit box, and the information about the second edit box includes text display content, the cursor position, and attribute information of the second edit box; and setting an attribute of the first edit box according to the information about the second edit box, obtaining a backward invoking input response message, and sending the backward invoking input response message to the set top box.

With reference to the first possible implementation manner of the first aspect or the second possible implementation manner of the first aspect, in a third possible implementation manner of the first aspect, the method further includes: generating an end-of-editing message according to end-of-editing operation information of an operator, where the end-of-editing message carries an executable operation of the set top box; and sending the end-of-editing message to the set top box, where the end-of-editing message is used to enable the set top box to obtain information about the executable operation and execute the executable operation.

With reference to the first aspect, the first possible implementation manner of the first aspect, the second possible implementation manner of the first aspect, or the third possible implementation manner of the first aspect, in a fourth possible implementation manner of the first aspect, detecting whether the display content of the first edit box at the current moment and the display content of the first edit box at the previous moment are the same includes: acquiring the first display content that is displayed in the first edit box at the current moment, where the first display content includes first text information and a first cursor position; and determining whether the first display content and the second display content that is displayed in the first edit box at the previous moment are the same, where the second display content includes second text information and a second cursor position, and if the first text information and the second text information are the same and the first cursor position and the second cursor position are the same, it is determined that the first display content and the second display content are the same; if the first text information and the second text information are different and/or the first cursor position and the second cursor position are different, it is determined that the first display content and the second display content are different.

With reference to the first aspect, in a fifth possible implementation manner of the first aspect, enabling the virtual input method of the set top box beforehand includes: establishing a wireless communication channel between the handheld device and the set top box; generating an enabling message according to operation information about enabling virtual input, and sending the enabling message to the set top box through the wireless communication channel, where the enabling message is used to enable the set top box to set the virtual input method to a default input method and obtain an enabling success result; and receiving the enabling success result sent by the set top box, and displaying prompt information that the virtual input is available.

With reference to the fifth possible implementation manner of the first aspect, in a sixth possible implementation manner of the first aspect, the method further includes: generating a disabling message according to operation information about disabling the virtual input, and providing the disabling message for the set top box, where the disabling message is used by the set top box to set a system input method of the set top box to the default input method and obtain a disabling success result; and receiving the disabling success result sent by the set top box, and displaying prompt information that the virtual input is unavailable.

According to a second aspect, the present application provides a text information input method, applied to a set top box in which a virtual input method is enabled beforehand, where the method includes: acquiring display content sent by a handheld device, where the display content is display content of a first edit box of the handheld device at a current moment; and updating, according to the display content, display content of a second edit box correspondingly displayed by the set top box.

With reference to the second aspect, in a first possible implementation manner of the second aspect, the acquiring display content sent by a handheld device includes: receiving a forward invoking input request message sent by the handheld device, where the forward invoking input request message is generated when the handheld device detects that a cursor position of the set top box is in the second edit box; acquiring information about the second edit box of the set top box, where the information about the second edit box includes text display content, the cursor position, and attribute information of the second edit box; returning a forward invoking input response message to the handheld device, where the forward invoking input response message carries the information about the second edit box; and receiving corresponding display content obtained by the handheld device according to the forward invoking input response message.

With reference to the second aspect, in a second possible implementation manner of the second aspect, the acquiring display content sent by a handheld device includes: detecting whether a cursor position is in the second edit box, and if the cursor position is in the second edit box, acquiring information about the second edit box, where the information about the second edit box includes text display content, the cursor position, and attribute information of the second edit box; generating a backward invoking input request message that carries the information about the second edit box, and sending the backward invoking input request message to the handheld device, where the backward invoking input request message is used to enable the handheld device to set an attribute of the first edit box according to the information about the second edit box and obtain a backward invoking input response message; and receiving the display content of the first edit box at the current moment that is sent by the handheld device after the handheld device returns the backward invoking input response message.

With reference to the second aspect, the first possible implementation manner of the second aspect, or the second possible implementation manner of the second aspect, in a third possible implementation manner of the second aspect, the method further includes: receiving an end-of-editing message sent by the handheld device, where the end-of-editing message is generated when the handheld device receives end-of-editing operation information of an operator, and the end-of-editing message carries an executable operation of the set top box; and parsing the end-of-editing message to obtain the executable operation, and executing the executable operation.

With reference to the second aspect, in a fourth possible implementation manner of the second aspect, a process of enabling the virtual input method of the set top box beforehand includes: establishing a wireless communication channel between the set top box and the handheld device according to a connection request sent by the handheld device; receiving an enabling message that is used to enable the virtual input method and sent by the handheld device through the wireless communication channel; and setting the virtual input method to a default input method according to the enabling message, obtaining an enabling success result, and returning the enabling success result to the handheld device, so that the handheld device displays prompt information that virtual input is available.

With reference to the fourth possible implementation manner of the second aspect, in a fifth possible implementation manner of the second aspect, the method further includes: receiving a disabling message generated by the handheld device according to operation information about disabling the virtual input; and setting a system input method of the set top box to the default input method according to the disabling message, obtaining a disabling success result, and sending the disabling success result to the handheld device, so that the handheld device displays prompt information that the virtual input is unavailable.

According to a third aspect, the present application further provides a text information input apparatus, including: an invoking unit, configured to invoke a first edit box of a handheld device; a first acquiring unit, configured to acquire an editing operation of text editing performed by an operator on the first edit box; an updating unit, configured to update display content of the first edit box according to the editing operation; a first detecting unit, configured to detect whether first display content of the first edit box at a current moment and second display content of the first edit box at a previous moment are the same, where the display content includes text information and cursor position information that are displayed in the first edit box; and a first sending unit, configured to send the first display content to the set top box when the first display content of the first edit box at the current moment and the second display content of the first edit box at the previous moment are different, so that displayed content of a second edit box correspondingly displayed by the set top box is updated.

With reference to the third aspect, in a first possible implementation manner of the third aspect, when a display interface on a handheld device side is exactly consistent with a display interface of the set top box, the invoking unit includes: a second detecting unit, configured to detect whether a cursor position of the set top box is in the second edit box; a second sending unit, configured to send a forward invoking input request message to the set top box when the cursor position of the set top box is in the second edit box, where the forward invoking input request message enables the set top box to acquire information about the second edit box, and the information about the second edit box includes text display content, the cursor position, and attribute information of the second edit box; a first receiving unit, configured to receive a forward invoking input response message obtained when the set top box responds to the forward invoking input request message, where the forward invoking input response message carries the information about the second edit box; and a first setting unit, configured to set an attribute of the first edit box according to the information about the second edit box.

With reference to the third aspect, in a second possible implementation manner of the third aspect, the invoking unit includes: a second receiving unit, configured to receive a backward invoking input request message sent by the set top box, where the backward invoking input request message is a request message generated by the set top box according to information about the second edit box after the set top box acquires the information about the second edit box when detecting that a cursor position is in the second edit box, and the information about the second edit box includes text display content, the cursor position, and attribute information of the second edit box; a second setting unit, configured to set an attribute of the first edit box according to the information about the second edit box and obtain a backward invoking input response message; and a third sending unit, configured to send the backward invoking input response massage to the set top box.

With reference to the first possible implementation manner of the third aspect or the second possible implementation manner of the third aspect, in a third possible implementation manner of the third aspect, the apparatus further includes: a third receiving unit, configured to receive end-of-editing operation information of an operator; a first message generating unit, configured to generate an end-of-editing message according to the end-of-editing operation information, where the end-of-editing message carries an executable operation of the set top box; and a fourth sending unit, configured to send the end-of-editing message to the set top box, where the end-of-editing message is used to enable the set top box to obtain information about the executable operation and execute the executable operation.

According to a fourth aspect, the present application further provides a text information input apparatus, including: a first acquiring unit, configured to acquire display content sent by a handheld device, where the display content is display content of a first edit box of the handheld device at a current moment; and an updating unit, configured to update, according to the display content, display content of a second edit box correspondingly displayed by the set top box.

With reference to the fourth aspect, in a first possible implementation manner of the fourth aspect, the first acquiring unit includes: a first receiving unit, configured to receive a forward invoking input request message sent by the handheld device, where the forward invoking input request message is generated when the handheld device detects that a cursor position of the set top box is in the second edit box; a second acquiring unit, configured to acquire information about the second edit box of the set top box, where the information about the second edit box includes text display content, the cursor position, and attribute information of the second edit box; a response message returning unit, configured to return a forward invoking input response message to the handheld device, where the forward invoking input response message carries the information about the second edit box; and a second receiving unit, configured to receive corresponding display content obtained by the handheld device according to the forward invoking input response message.

With reference to the fourth aspect, in a second possible implementation manner of the fourth aspect, the first acquiring unit includes: a first detecting unit, configured to detect whether a cursor position is in the second edit box; a third acquiring unit, configured to acquire information about the second edit box when the cursor position is in the second edit box, where the information about the second edit box includes text display content, the cursor position, and attribute information of the second edit box; a request message generating unit, configured to generate a backward invoking input request message, where the backward invoking input request message carries the information about the second edit box; a first sending unit, configured to send the backward invoking input request message to the handheld device, where the backward invoking input request message is used to enable the handheld device to set an attribute of the first edit box according to the information about the second edit box and obtain a backward invoking input response message; and a third receiving unit, configured to receive the display content of the first edit box at the current moment that is sent by the handheld device after the handheld device returns the backward invoking input response message.

With reference to the fourth aspect, the first possible implementation manner of the fourth aspect, or the second possible implementation manner of the fourth aspect, in a third possible implementation manner of the fourth aspect, the apparatus further includes: a fourth receiving unit, configured to receive an end-of-editing message sent by the handheld device, where the end-of-editing message is generated when the handheld device receives end-of-editing operation information of an operator, and the end-of-editing message carries an executable operation of the set top box; a parsing unit, configured to parse the end-of-editing message to obtain the executable operation; and an execution unit, configured to execute the executable operation.

Embodiments of the present application provide a text information input method and apparatus of a set top box: firstly, invoking a first edit box of a handheld device; afterwards, updating display content of the first edit box according to an editing operation performed by an operator on the first edit box; and then, detecting whether first display content of the first edit box at a current moment and second display content of the first edit box at a previous moment are the same, and if they are different (that is, the display content of the first edit box changes), sending the first display content to the set top box, so that the set top box updates display content of a second edit box. It is implemented that text information is input into the set top box by using a built-in input method of the handheld device. Not only operations of inputting and deleting a single character or a special symbol but also text editing operations such as cutting, copying, and deleting on massive text information can be implemented by using the handheld device. Therefore, text input efficiency and speed of the set top box are improved. In addition, text information displayed by the handheld device is synchronized with text information displayed by the edit box of the set top box, which makes it convenient for an operator to visually observe an editing state of the edit box of the set top box from a handheld device side.

BRIEF DESCRIPTION OF DRAWINGS

To describe the technical solutions in the embodiments of the present application more clearly, the following briefly introduces the accompanying drawings required for describing the embodiments. Apparently, a person of ordinary skill in the art may still derive other drawings from these accompanying drawings without creative efforts.

DESCRIPTION OF EMBODIMENTS

To make a person skilled in the art to better understand technical solutions in embodiments of the present application, and make the foregoing objectives, features, and advantages of the embodiments of the present application clearer and more comprehensible, the following describes the technical solutions of the embodiments of the present invention in more detail with reference to accompanying drawings.

Figure 1:
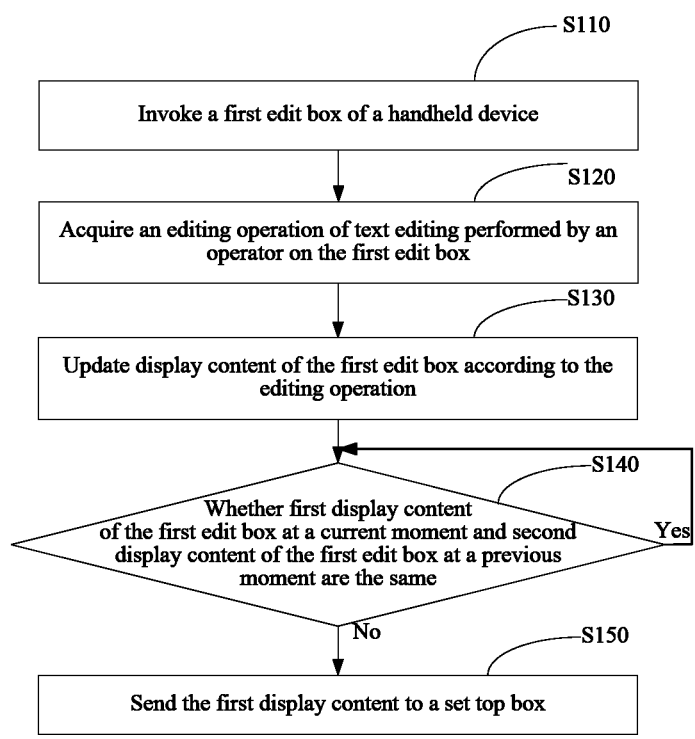
FIG. 1 is a schematic flowchart of a text information input method according to an embodiment of the present application.

Referring to FIG. 1, FIG. 1 is a schematic flowchart of a text information input method according to an embodiment of the present application. In the method, a built-in input method of a handheld device is used to input text information into a second edit box of a set top box.

Before the handheld device is used to input the text information into the set top box, firstly, the handheld device needs to be used to enable a virtual input method in the set top box beforehand, that is, to set a default input method of the set top box to the virtual input method. Afterwards, the built-in input method of the handheld device can be used to input the text information into the set top box. A process of enabling the virtual input method of the set top box beforehand by the handheld device may be implemented by using the following processes:

Firstly, a wireless communication channel is established between the handheld device and the set top box. Afterwards, an enabling message is generated according to operation information about enabling virtual input, and the enabling message is sent to the set top box through the wireless communication channel. Then, after receiving the enabling message, the set top box sets the virtual input method to the default input method, obtains an enabling success result, and saves configuration information of a system input method of the set top box, so that the set top box returns to use the system input method to input the text information in a subsequent step. Finally, according to the enabling success result sent by the set top box, a user is prompted that the virtual input is available.

As shown in FIG. 1, the handheld device first invokes a first edit box of the handheld device in step S110. The method of this embodiment is applied to the handheld device, where the handheld device may be an intelligent terminal, for example, a smartphone, a PDA intelligent terminal, a tablet computer.

Figure 2:
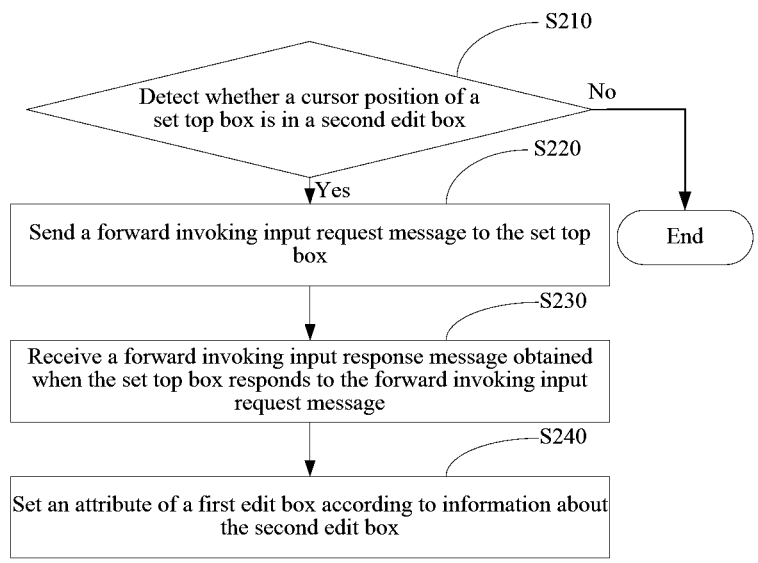
FIG. 2 is a schematic flowchart of invoking a first edit box of a handheld device in FIG. 1.

In an embodiment of the present application, when the set top box is in a particular application scenario (a display interface of the handheld device is exactly the same as a corresponding display interface of the set top box), invoking the first edit box of the handheld device may be implemented by using a method shown in FIG. 2, and includes the following substeps:

S210. Detect whether a cursor position of the set top box is in a second edit box; if the cursor position is in the second edit box, execute step S220; and if the cursor position is not in the second edit box, there comes the end.

In a particular application scenario of the set top box, the display interface of the handheld device is exactly the same as the display interface of the set top box. Therefore, the handheld device detects whether a cursor on a set top box side is in the second edit box by detecting whether a cursor on the display interface of the handheld device is in the edit box.

S220. Send a forward invoking input request message to the set top box, where the forward invoking input request message enables the set top box to acquire information about the second edit box, and the information about the second edit box includes text display content, the cursor position, and attribute information of the second edit box.

The attribute information of the second edit box may include a plaintext or ciphertext input requirement, a length of input content, a requirement on an input keyboard, and an executable operation of the second edit box. The executable operation may be an execution operation instructed after the second edit box completes a text editing operation, and the execution operation may include operations such as cursor down, search action, webpage jump, and information sending.

S230. Receive a forward invoking input response message obtained when the set top box responds to the forward invoking input request message, where the forward invoking input response message carries the information about the second edit box.

S240. Set an attribute of the first edit box according to the information about the second edit box.

The handheld device sets an input attribute of the first edit box according to the attribute information of the second edit box that is carried in the received forward invoking input response message, to obtain the first edit box of which attribute is the same as the attribute of the second edit box on a handheld device side, that is, to implement invoking of an edit box on the handheld device side.

In addition, the text display content and the cursor position of the second edit box are synchronously displayed in the first edit box, that is, it is implemented that display of the first edit box is exactly the same as display of the second edit box. At this moment, by editing content that is displayed in the first edit box, the user may implement editing of existing display content of the second edit box, and the editing may include operations of inputting and deleting a single character or a special symbol and may also be text editing operations such as cutting, copying, and deleting on massive text information.

Figure 3:
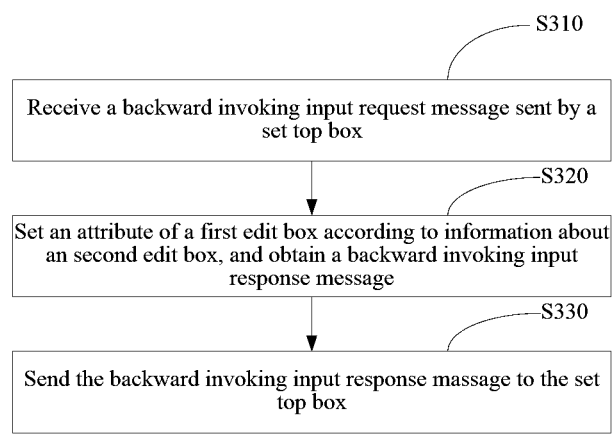
FIG. 3 is another schematic flowchart of invoking a first edit box of a handheld device in FIG. 1.

In another embodiment of the present application, when the set top box detects that text information needs to be input into the second edit box, the first edit box of the handheld device may be directly invoked, which, as shown in FIG. 3, may include the following substeps:

S310. Receive a backward invoking input request message sent by the set top box.

The set top box detects whether the cursor position is in the second edit box, and if the cursor position is in the second edit box, it indicates that the second edit box requires text information editing, the information about the second edit box is acquired, the backward invoking input request message is generated according to the information about the second edit box, and the backward invoking input request message is sent to the handheld device. The information about the second edit box includes the text display content, the cursor position, and the attribute information of the second edit box.

In an embodiment of the present application, the set top box acquires text information of a corresponding control of the current cursor, and if the text information is successfully acquired, it indicates that the cursor is in the second edit box, that is, the second edit box requires text editing; if the text information fails to be acquired, it indicates that the cursor is not in the second edit box, that is, the second edit box does not require a text editing operation.

S320. Set an attribute of the first edit box according to information about the second edit box, and obtain a backward invoking input response message. In this step, a process of setting the attribute of the first edit box according to the information about the second edit box is the same as step S240 in FIG. 2, and details are not described herein again.

S330. Send the backward invoking input response message to the set top box, and prompt the user that virtual input is available currently. Steps S310 to S330 complete a process of invoking the first edit box by the handheld device.

After the first edit box is successfully invoked, in step S120, an editing operation of text editing performed by an operator on the first edit box is acquired. For example, the editing operation may be operations of inputting and deleting a single character or a special symbol and may also be text editing operations such as cutting, copying, and deleting on massive text information.

S130. Update display content of the first edit box according to the editing operation. The display content includes text information and cursor position information that are displayed in the first edit box.

S140. Detect whether first display content of the first edit box at a current moment and second display content of the first edit box at a previous moment are the same; if they are different, execute step S150; otherwise, return to execute step S140 until operation information indicating that an editing operation is ended is received.

In an embodiment of the present application, a detection process in step S140 may be implemented by using the following processes:

Firstly, the first display content that is displayed in the first edit box at the current moment is acquired, where the first display content includes first text information and a first cursor position. Afterwards, it is determined whether the first display content and the second display content that is displayed in the first edit box at the previous moment are the same. The second display content that is displayed in the first edit box at the previous moment is already stored in the handheld device. The second display content includes second text information and a second cursor position. When two types of information, the text information and the cursor position that are displayed in the first edit box, are both the same, it is determined that the first display content and the second display content are the same; when at least one information of the two types of information, the text information and the cursor position that are displayed in the first edit box, is different, it is determined that the first display content and the second display content are different.

S150. Send the first display content to the set top box, so that displayed content of a second edit box correspondingly displayed by the set top box is updated.

In a text information input method provided in this embodiment, firstly, a first edit box of a handheld device is invoked; afterwards, display content of the first edit box is updated according to an editing operation performed by an operator on the first edit box; and then, it is detected whether first display content of the first edit box at a current moment and second display content of the first edit box at a previous moment are the same, and if they are different, the first display content is sent to a set top box, so that the set top box updates display content of a second edit box. As a result, the display content of the second edit box of the set top box is synchronized with the display content of the first edit box of the handheld device, which further makes it convenient for a user to use a built-in input method of the handheld device to implement operations of inputting and deleting a single character or a special symbol and also implement text editing operations such as cutting and copying on massive text information, thereby improving text input efficiency and speed of the set top box.

Figure 4:
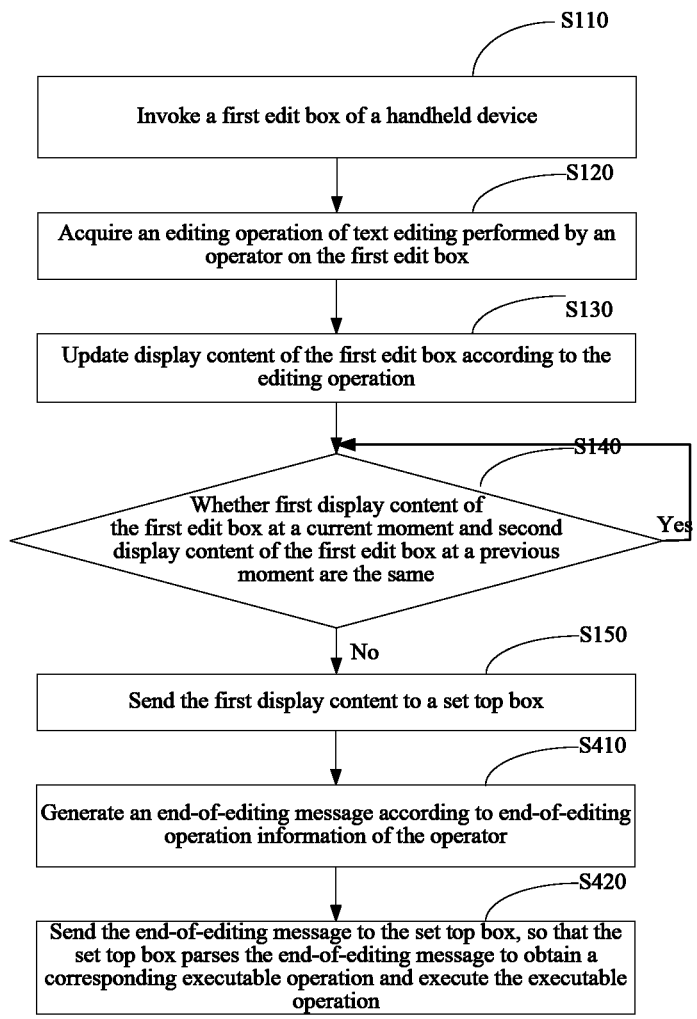
FIG. 4 is a schematic flowchart of another text information input method according to an embodiment of the present application.

Referring to FIG. 4, FIG. 4 shows a schematic flowchart of another text information input method according to an embodiment of the present application. What is different from the embodiment corresponding to FIG. 1 is that after a user uses a built-in input method of a handheld device to complete a text information input operation, a set top box is enabled to automatically execute a subsequent executable operation. The method may include the following steps:

S110. Invoke a first edit box of a handheld device.

S120. Acquire an editing operation of text editing performed by an operator on the first edit box.

S130. Update display content of the first edit box according to the editing operation, where the display content includes text information and cursor position information that are displayed in the first edit box.

S140. Detect whether first display content of the first edit box at a current moment and second display content of the first edit box at a previous moment are the same; if they are different, execute step S150; and if they are the same, return to execute step S140.

Send the first display content to the set top box, so that displayed content of a second edit box correspondingly displayed by the set top box is updated.

S410. Generate an end-of-editing message according to end-of-editing operation information of an operator, where the end-of-editing message carries an executable operation of the set top box.

The executable operation is obtained, when the first edit box of the handheld device is invoked, from received information about the second edit box that is sent by the set top box, and specifically, attribute information of the information about the second edit box includes the subsequent executable operation of the second edit box.

S420. Send the end-of-editing message to the set top box, so that the set top box parses the end-of-editing message to obtain a corresponding executable operation and execute the executable operation.

In a text information input method provided in this embodiment, after a text information input operation on a set top box is completed by using a handheld device, an end-of-editing message that includes an executable operation may be obtained according to an end-of-editing operation of an operator, and the end-of-editing message is sent to the set top box, so that the set top box parses the end-of-editing message to obtain the executable operation, and automatically executes the executable operation. Therefore, a user does not need to use a remote controller to manually trigger the set top box to execute a subsequent executable operation, thereby improving intelligence of the set top box.

Figure 5:
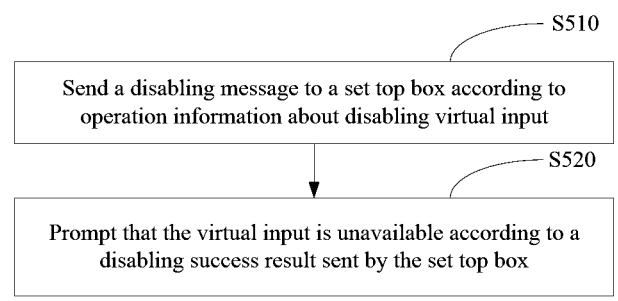
FIG. 5 is a schematic flowchart of disabling a set top box according to an embodiment of the present application.

Referring to FIG. 5, FIG. 5 shows a schematic flowchart of disabling virtual input of a set top box according to an embodiment of the present application. When a user does not use a handheld device to perform text information editing on the set top box any more, virtual input setting of the set top box may be cancelled by using the handheld device. The method may include the following steps:

S510. Send a disabling message to the set top box according to operation information about disabling the virtual input.

After receiving the disabling message, the set top box sets a system input method of the set top box to a default input method and obtains a disabling success result.

S520. Prompt that the virtual input is unavailable according to the disabling success result sent by the set top box.

It can be understood by a person skilled in the art that steps S510 and S520 only need to meet that they are performed after a virtual input method in the set top box is enabled beforehand, and steps S510 and S520 have nothing to do with whether the operator uses a built-in input method of the handheld device to perform text editing on the set top box after the virtual input method of the set top box is successfully enabled. That is, a disabling action may be performed after a text editing operation on the set top box is completed by using the handheld device, and may also be performed after an enabling action and before the text editing operation on the set top box is executed by using the handheld device.

In a text information input method provided in this embodiment, after a virtual input method in a set top box is enabled beforehand, a disabling message may further be sent to the set top box, so that the set top box sets a system input method to a default input method again to restore a function of performing, by using a remote controller, text editing on the set top box, thereby improving flexibility of performing text information editing on the set top box.

Corresponding to the foregoing text information input method applied to a handheld device side, the present application further provides a text information input method applied to a set top box side.

Figure 6:
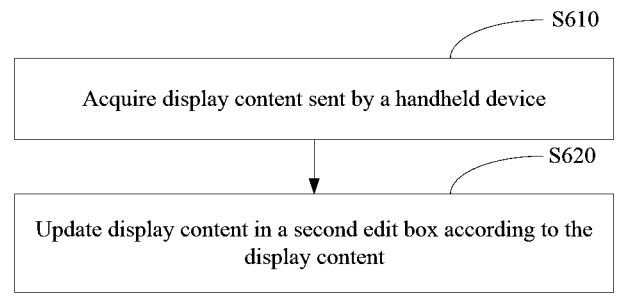
FIG. 6 is a schematic flowchart of a text information input method according to an embodiment of the present application.

Referring to FIG. 6, FIG. 6 shows a schematic flowchart of a text information input method according to an embodiment of the present application. The method of this embodiment is applied to a set top box, and the method may include the following steps:

Before a handheld device is used to input text information into the set top box, a virtual input function of the set top box needs to be enabled first. Enabling the virtual input function of the set top box may include the following substeps:

Firstly, a wireless communication channel is established between the set top box and the handheld device according to a connection request sent by the handheld device. Afterwards, an enabling message that is used to enable a virtual input method and sent by the handheld device through the wireless communication channel is received. Then, the virtual input method is set to a default input method according to the enabling message, and an enabling success result is obtained. In addition, configuration information of a system input method of the set top box is saved, so as to restore a system input function of the set top box subsequently. Finally, the enabling success result is returned to the handheld device, so that the handheld device displays prompt information that virtual input is available.

S610. Acquire display content sent by a handheld device, where the display content is display content of a first edit box of the handheld device at a current moment.

Figure 7:
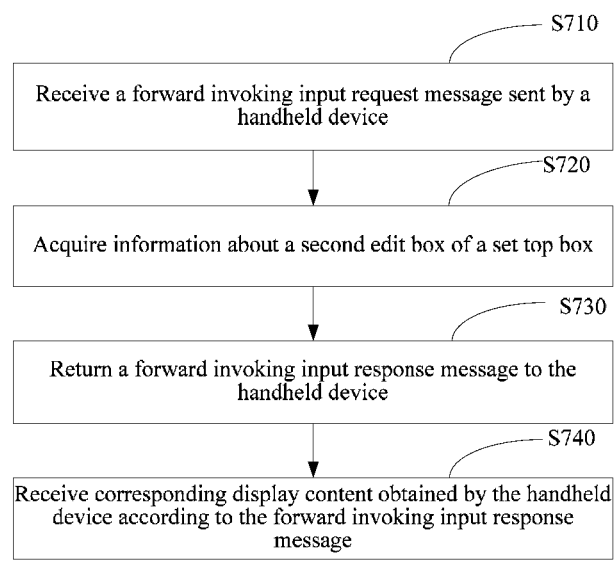
FIG. 7 is a schematic flowchart of step S610 in FIG. 6.

When the set top box is in a particular application scenario (a display interface of the handheld device is exactly the same as a corresponding display interface of the set top box), the handheld device may actively invoke its own first edit box. A specific invoking process is shown in FIG. 7, and may include the following substeps:

S710. Receive a forward invoking input request message sent by the handheld device.

When detecting that a cursor position of the set top box is in a second edit box, the handheld device sends the forward invoking input request message. When the set top box is in a particular application scenario, the display interface of the handheld device is exactly the same as the display interface of the set top box, and the handheld device detects whether a cursor on a set top box side is in the second edit box by detecting whether a cursor displayed on the display interface is in an edit box.

S720. Acquire information about the second edit box of the set top box, where the information about the second edit box includes text display content, the cursor position, and attribute information of the second edit box.

S730. Return a forward invoking input response message to the handheld device, where the forward invoking input response message carries the information about the second edit box.

S740. Receive corresponding display content obtained by the handheld device according to the forward invoking input response message.

After receiving the forward invoking input response message, the handheld device sets an attribute of the first edit box according to the information about the second edit box, and acquires an editing operation of text editing performed by a user on the first edit box; display content of the first edit box is updated according to the editing operation, where the display content includes text information and cursor position information that are displayed in the first edit box; it is detected whether first display content of the first edit box at a current moment and second display content of the first edit box at a previous moment are the same, and if they are different, the first display content is sent to the set top box.

Figure 8:
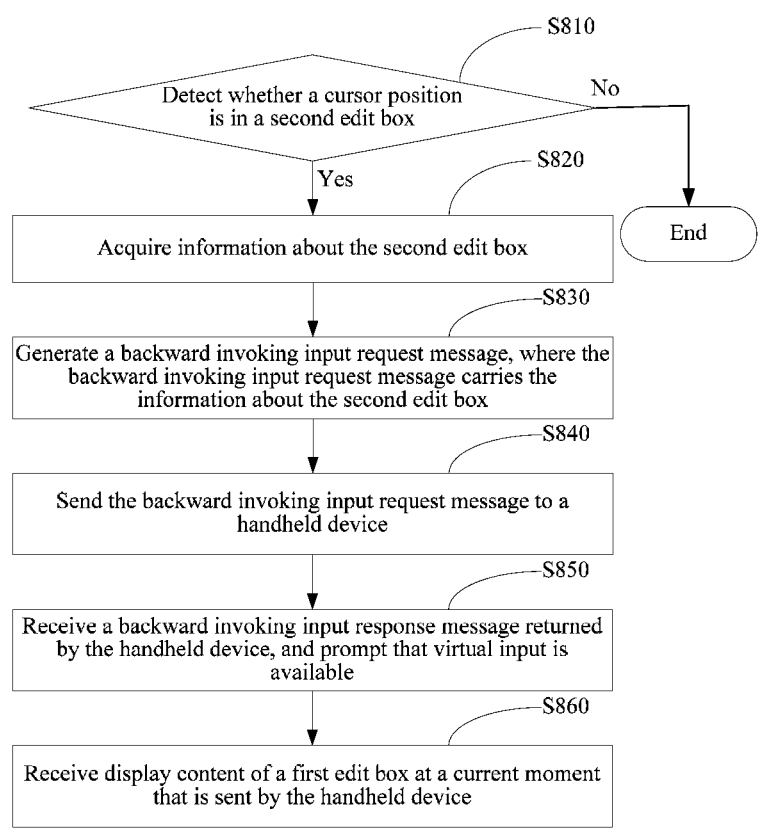
FIG. 8 is another schematic flowchart of step S610 in FIG. 6.

When the set top box detects that the second edit box requires text editing, as shown in FIG. 8, the following substeps may be included:

S810. Detect whether a cursor position is in a second edit box; if the cursor position is in the second edit box, execute step S820; and if the cursor position is not in the second edit box, there comes the end.

S820. Acquire information about the second edit box, where the information about the second edit box includes text display content, the cursor position, and attribute information of the second edit box.

S830. Generate a backward invoking input request message, where the backward invoking input request message carries the information about the second edit box.

S840. Send the backward invoking input request message to the handheld device.

After receiving the backward invoking input request message, the handheld device sets the attribute of the first edit box according to the information about the second edit box, and obtains a backward invoking input response message.

S850. Receive the backward invoking input response message returned by the handheld device, and prompt that the virtual input is available.

S860. Receive the display content of the first edit box at the current moment that is sent by the handheld device.

After returning the backward invoking input response message, the handheld device receives an editing operation of a user and updates display content of the first edit box according to the editing operation, where the display content includes text information and cursor position information that are displayed in the first edit box; it is detected whether the first display content of the first edit box at the current moment and the second display content of the first edit box at the previous moment are the same, and if they are different, the first display content is sent to the set top box.

S620. Update display content in the second edit box according to the display content.

In a text information input method provided in this embodiment, after a first edit box of a handheld device is invoked, display content of the first edit box is acquired, and display content of a second edit box is updated according to the obtained display content, so as to implement text editing on a set top box by using a built-in input method of the handheld device. A user uses the built-in input method of the handheld device to implement operations of inputting and deleting a single character or a special symbol and also implement text editing operations such as cutting and copying on massive text information, thereby improving text input efficiency and speed of the set top box.

Figure 9:
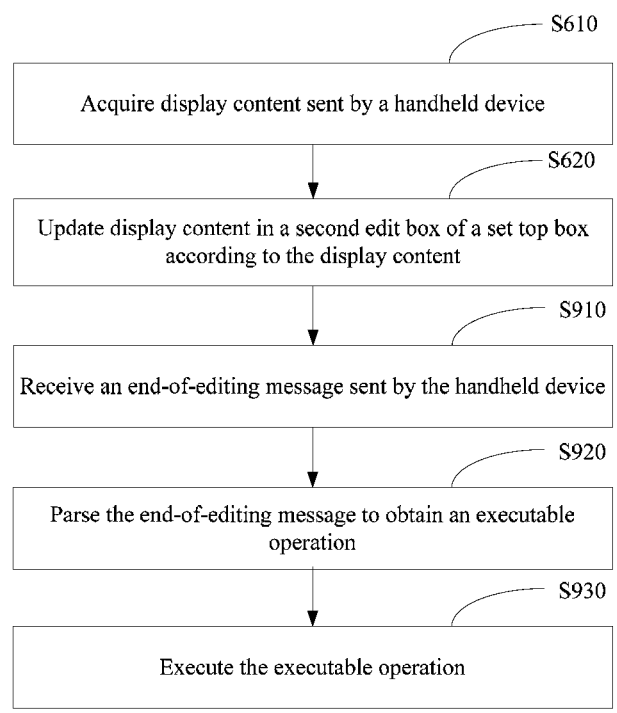
FIG. 9 is a schematic flowchart of another text information input method according to an embodiment of the present application.

Referring to FIG. 9, FIG. 9 shows a schematic flowchart of another text information input method according to an embodiment of the present application. After editing on a second edit box is completed, a subsequent executable operation may further be executed automatically.

S610. Acquire display content sent by a handheld device, where the display content is display content of a first edit box of the handheld device at a current moment.

S620. Update display content in a second edit box of a set top box according to the display content.

S910. Receive an end-of-editing message sent by the handheld device.

When receiving end-of-editing operation information of an operator, the handheld device sends the end-of-editing message to the set top box, and the end-of-editing message carries an executable operation of the set top box.

S920. Parse the end-of-editing message to obtain the executable operation.

S930. Execute the executable operation.

In a text information input method provided in this embodiment, after a text information input operation on a set top box is completed by using a handheld device, an end-of-editing message that includes an executable operation may be obtained according to an end-of-editing operation of an operator; the end-of-editing message is sent to the set top box; and the set top box parses the end-of-editing message to obtain the executable operation, and automatically executes the executable operation. Therefore, a user does not need to use a remote controller to manually trigger the set top box to execute a subsequent executable operation, thereby improving intelligence of the set top box.

Figure 10:
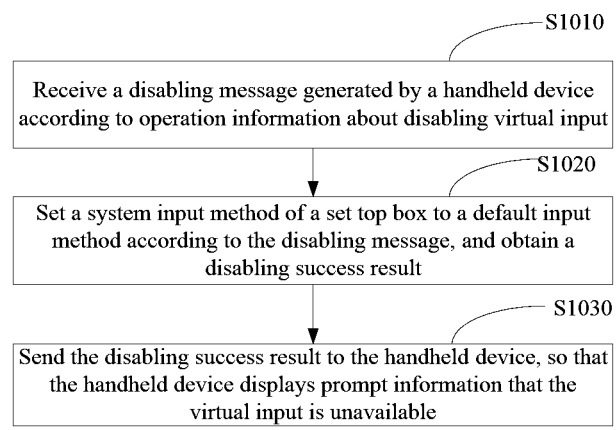
FIG. 10 is a schematic flowchart of disabling virtual input of a set top box according to an embodiment of the present application.

Referring to FIG. 10, FIG. 10 shows a schematic flowchart of still another text information input method according to an embodiment of the present application. When a user does not want to use a handheld device to perform text editing on a set top box, a system input function of the set top box may be restored. As shown in FIG. 10, the following steps may be included:

S1010. Receive a disabling message generated by the handheld device according to operation information about disabling virtual input.

S1020. Set a system input method of the set top box to a default input method according to the disabling message, and obtain a disabling success result.

S1030. Send the disabling success result to the handheld device, so that the handheld device displays prompt information that the virtual input is unavailable.

In a text information input method provided in this embodiment, after a virtual input method in a set top box is enabled beforehand, the set top box may be further enabled to set a system input method to a default input method again to restore a function of performing, by using a remote controller, text editing on the set top box, thereby improving flexibility of performing text information editing on the set top box.

Figure 11A:
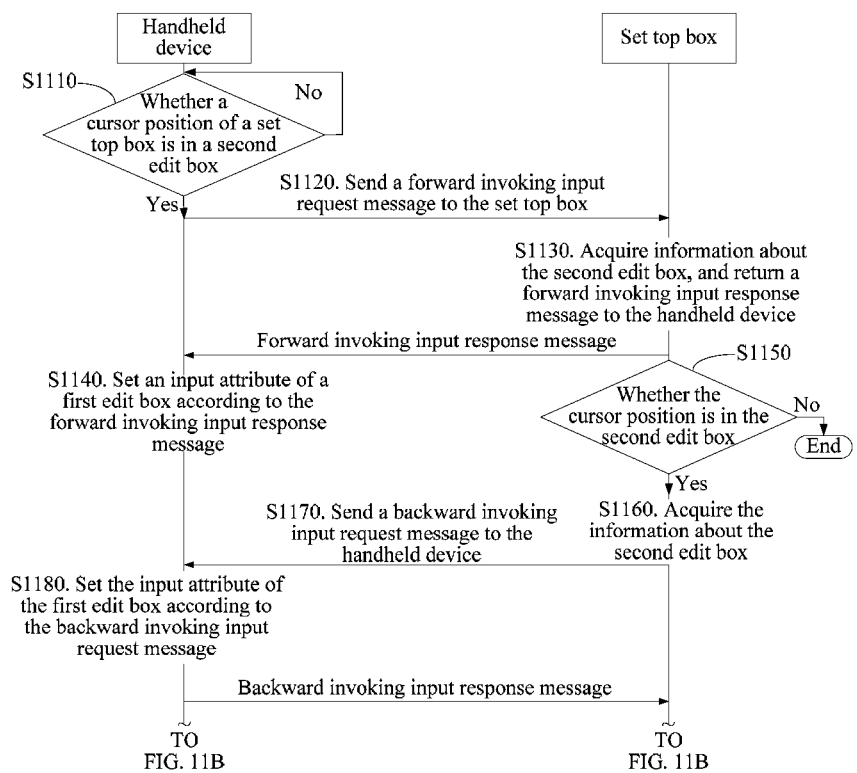
FIG. 11A and FIG. 11B are a schematic flowchart of a text information input method according to an embodiment of the present application.
Figure 11B:
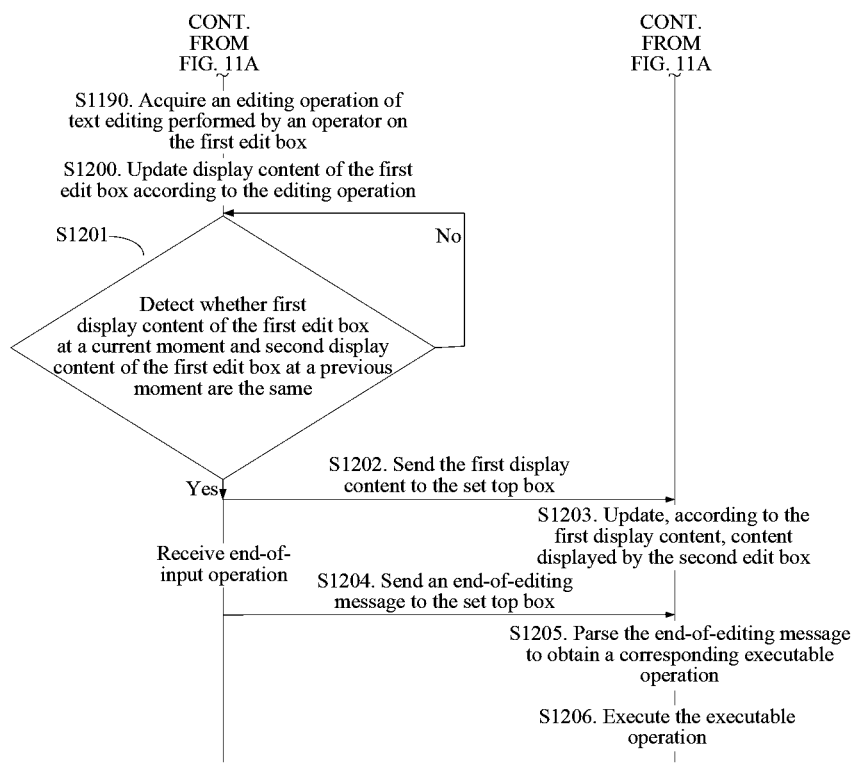

Referring to FIG. 11A and FIG. 11B, FIG. 11A and FIG. 11B show a schematic flowchart of a text information input method according to an embodiment of the present application. The method is applied to a system that includes a set top box and a handheld device, and the method includes the following steps:

S1110. The handheld device detects whether a cursor position of the set top box is in a second edit box; if the cursor position is in the second edit box, execute step S1120; and if the cursor is not in the second edit box, return to execute step S1110.

S1120. The handheld device sends a forward invoking input request message to the set top box.

S1130. The set top box acquires information about the second edit box and returns a forward invoking input response message to the handheld device, where the forward invoking input response message carries the information about the second edit box.

The set top box generates a corresponding forward invoking input response message according to the information about the second edit box, and sends the forward invoking input response message to the handheld device. The information about the second edit box includes text display content, the cursor position, and attribute information of the second edit box.

The attribute information of the second edit box may include a plaintext or ciphertext input requirement, a length of input content, a requirement on an input keyboard, and an executable operation of the second edit box. The executable operation may be an execution operation instructed after the second edit box completes a text editing operation, and the execution operation may include operations such as cursor down, search action, webpage jump, and information sending.

S1140. The handheld device sets an input attribute of a first edit box according to the forward invoking input response message.

It should be noted that steps S1110 to S1140 are an implementation process of actively invoking the first edit box by using the handheld device. A process of invoking the first edit box of the handheld device by using the set top box is illustrated as steps S1150 to S1180.

S1150. The set top box detects whether the cursor position is in the second edit box; if the cursor position is in the second edit box, execute step S1160; and if the cursor position is not in the second edit box, return to execute step S1150.

S1160. The set top box acquires the information about the second edit box, where the information about the second edit box includes the text display content, the cursor position, and the attribute information of the second edit box.

S1170. Send a backward invoking input request message to the handheld device, where the backward invoking input request message carries the information about the second edit box.

S1180. The handheld device sets an attribute of the first edit box according to the backward invoking input request message, and returns a backward invoking input response message to the set top box.

S1190. The handheld device acquires an editing operation of text editing performed by an operator on the first edit box.

S1200. The handheld device updates display content of the first edit box according to the editing operation, where the display content includes text information and cursor position information that is displayed in the first edit box.

S1201. The handheld device detects whether first display content of the first edit box at a current moment and second display content of the first edit box at a previous moment are the same; if they are different, execute step S1202; otherwise, return to execute step S1201.

S1202. The handheld device sends the first display content to the set top box.

S1203. The set top box updates content of the second edit box according to the first display content.

S1204. The handheld device sends an end-of-editing message to the set top box, where the end-of-editing message is a corresponding end-of-editing message generated when the handheld device receives end-of-editing operation information of an operator, and the end-of-editing message carries an executable operation of the set top box.

S1205. The set top box parses the end-of-editing message to obtain a corresponding executable operation.

S1206. The set top box performs the executable operation.

In all the foregoing text input method embodiments of the present application, all messages for communication between a set top box and a handheld device use XML (Extensible Markup Language). In this case, after receiving an XML message sent by the handheld device, the set top box needs to first parse the XML message and then perform a corresponding operation according to the parsed message; when a message is sent to the handheld device, the message needs to be converted into an XML format before being sent to the handheld device. Likewise, when the handheld device communicates with the set top box, a handheld device side also needs to perform processes of message parsing and message conversion.

Corresponding to the method embodiments shown in FIG. 1 to FIG. 5, the present application further provides corresponding apparatus embodiments.

Figure 12:
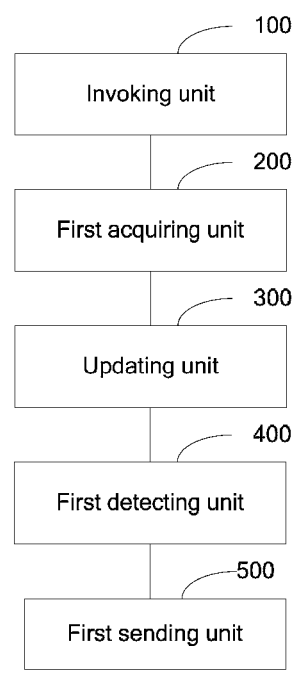
FIG. 12 is a schematic structural diagram of a text information input apparatus according to an embodiment of the present application.

Referring to FIG. 12, FIG. 12 shows a schematic structural diagram of a text information input apparatus according to an embodiment of the present application. The apparatus may include an invoking unit 100, a first acquiring unit 200, an updating unit 300, a first detecting unit 400, and a first sending unit 500.

The invoking unit 100 is configured to invoke a first edit box of a handheld device.

Figure 13:
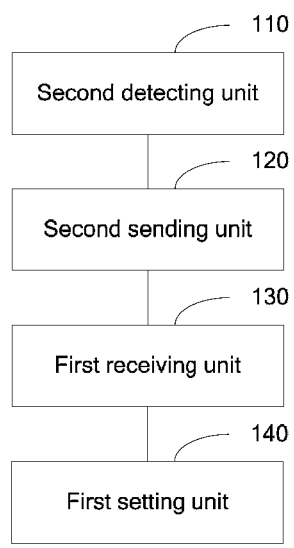
FIG. 13 is a schematic structural diagram of an invoking unit according to an embodiment of the present application.

When a display interface on a handheld device side is exactly consistent with a display interface of a set top box, that is, the set top box is in a particular application scenario (a display interface of the handheld device is exactly the same as a corresponding display interface of the set top box), as shown in FIG. 13, the invoking unit 100 may include the following subunits:

a second detecting unit 110, configured to detect whether a cursor position of the set top box is in a second edit box;

a second sending unit 120, configured to send a forward invoking input request message to the set top box when the cursor position of the set top box is in the second edit box, where the forward invoking input request message enables the set top box to acquire information about the second edit box, and the information about the second edit box includes text display content, the cursor position, and attribute information of the second edit box;

a first receiving unit 130, configured to receive a forward invoking input response message obtained when the set top box responds to the forward invoking input request message, where the forward invoking input response message carries the information about the second edit box; and a first setting unit 140, configured to set an attribute of the first edit box according to the information about the second edit box.

Figure 14:
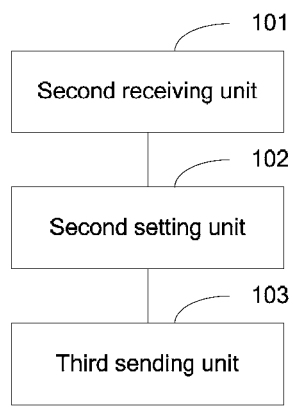
FIG. 14 is a schematic structural diagram of another invoking unit according to an embodiment of the present application.

When the set top box invokes the first edit box of the handheld device after detecting that the second edit box requires text editing, as shown in FIG. 14, the invoking unit 100 may include the following subunits: a second receiving unit 101, a second setting unit 102, and a third sending unit 103.

The second receiving unit 101 is configured to receive a backward invoking input request message sent by the set top box.

When the set top box detects that a cursor is in the second edit box, the backward invoking input request message that includes information about the second edit box is generated. The information about the second edit box includes the text display content, the cursor position, and the attribute information of the second edit box.

The second setting unit 102 is configured to set the attribute of the first edit box according to the information about the second edit box, and obtain a backward invoking input response message.

The third sending unit 103 is configured to send the backward invoking input response massage to the set top box, so that the set top box prompts a user that virtual input is available.

The first acquiring unit 200, connected to the invoking unit, is configured to acquire an editing operation of text editing performed by an operator on the first edit box.

The updating unit 300 is configured to update display content of the first edit box according to the editing operation.

The first detecting unit 400 is configured to detect whether first display content of the first edit box at a current moment and second display content of the first edit box at a previous moment are the same, where the display content includes text information and cursor position information that are displayed in the first edit box.

The first sending unit 500 is configured to send the first display content to the set top box when the first display content of the first edit box at the current moment and the second display content of the first edit box at the previous moment are different, so that displayed content of a second edit box correspondingly displayed by the set top box is updated.

In a text information input apparatus provided in this embodiment, firstly, an invoking unit is used to invoke a first edit box of a handheld device; afterwards, an updating unit is used to update display content of the first edit box according to an editing operation performed by an operator on the first edit box; and then, a first detecting unit detects whether first display content of the first edit box at a current moment and second display content of the first edit box at a previous moment are the same, and if they are different, a first sending unit sends the first display content to a set top box, so that the set top box updates display content of a second edit box. As a result, the display content of the second edit box of the set top box is synchronized with the display content of the first edit box of the handheld device, which further makes it convenient for a user to use a built-in input method of the handheld device to implement operations of inputting and deleting a single character or a special symbol and also implement text editing operations such as cutting and copying on massive text information, thereby improving text input efficiency and speed of the set top box.

Figure 15:
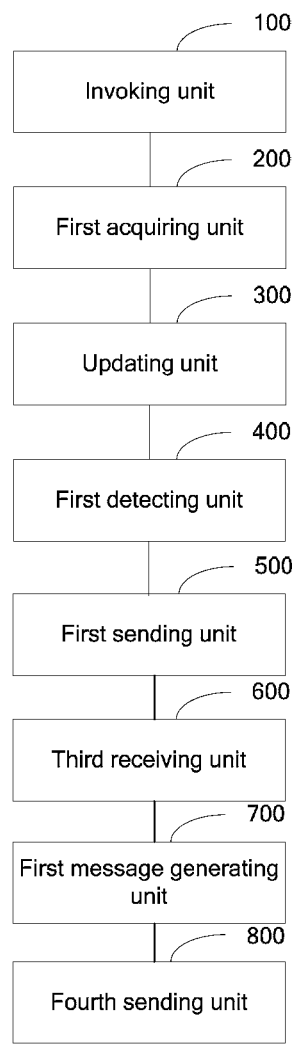
FIG. 15 is a schematic structural diagram of another text information input apparatus according to an embodiment of the present application.

Referring to FIG. 15, FIG. 15 shows a schematic structural diagram of another text information input apparatus according to an embodiment of the present application. What is different from the apparatus shown in FIG. 12 is that a third receiving unit, a first message generating unit, and a fourth sending unit are further included. As shown in FIG. 15, the apparatus includes an invoking unit 100, a first acquiring unit 200, an updating unit 300, a first detecting unit 400, a first sending unit 500, a third receiving unit 600, a first message generating unit 700, and a fourth sending unit 800.

The invoking unit 100 is configured to invoke a first edit box of a handheld device.

The first acquiring unit 200, connected to the invoking unit, is configured to acquire an editing operation of text editing performed by an operator on the first edit box.

The updating unit 300 is configured to update display content of the first edit box according to the editing operation.

The first detecting unit 400 is configured to detect whether first display content of the first edit box at a current moment and second display content of the first edit box at a previous moment are the same, where the display content includes text information and cursor position information that are displayed in the first edit box.

The first sending unit 500 is configured to send the first display content to a set top box when the first display content of the first edit box at the current moment and the second display content of the first edit box at the previous moment are different, so that displayed content of a second edit box correspondingly displayed by the set top box is updated.

The third receiving unit 600 is configured to receive end-of-editing operation information of an operator.

The first message generating unit 700 is configured to generate an end-of-editing message according to the end-of-editing operation information, where the end-of-editing message carries an executable operation of the set top box.

The fourth sending unit 800 is configured to send the end-of-editing message to the set top box, where the end-of-editing message enables the set top box to obtain information about the executable operation and execute the executable operation.

In a text information input apparatus provided in this embodiment, a third receiving unit receives end-of-editing operation information of an operator; further, a first message generating unit obtains an end-of-editing message that includes an executable operation according to the end-of-editing operation information, and a fourth sending unit sends the end-of-editing message to a set top box. The set top box parses the end-of-editing message to obtain the executable operation and automatically executes the executable operation. Therefore, a user does not need to use a remote controller to manually trigger the set top box to execute a subsequent executable operation, thereby improving intelligence of the set top box.

Corresponding to the method embodiments in the foregoing FIG. 6 to FIG. 10, embodiments of the present application further provide corresponding apparatus embodiments.

Figure 16:
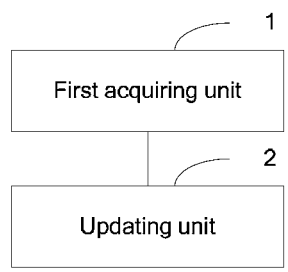
FIG. 16 is a schematic structural diagram of a text information input apparatus according to an embodiment of the present application.

Referring to FIG. 16, FIG. 16 shows a schematic structural diagram of a text information input apparatus according to an embodiment of the present application. The apparatus includes a first acquiring unit 1 and an updating unit 2.

The first acquiring unit 1 is configured to acquire display content sent by a handheld device, where the display content is display content of a first edit box of the handheld device at a current moment.

Figure 17:
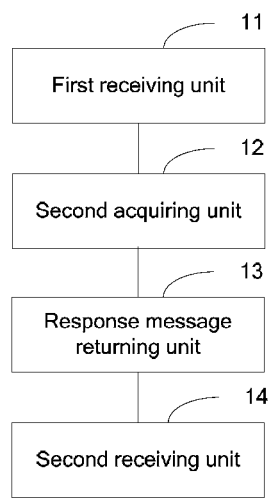
FIG. 17 is a schematic structural diagram of a first acquiring unit according to an embodiment of the present application.

When a display interface on a handheld device side is exactly consistent with a display interface of a set top box, as shown in FIG. 17, the first acquiring unit 1 may include the following subunits: a first receiving unit 11, a second acquiring unit 12, a response message returning unit 13, and a second receiving unit 14.

The first receiving unit 11 is configured to receive a forward invoking input request message sent by the handheld device, where the forward invoking input request message is sent when the handheld device detects that a cursor position of the set top box is in a second edit box.

The second acquiring unit 12 is configured to acquire information about the second edit box of the set top box, where the information about the second edit box includes text display content, the cursor position, and attribute information of the second edit box.

The response message returning unit 13 is configured to return a forward invoking input response message to the handheld device, where the forward invoking input response message carries the information about the second edit box.

The second receiving unit 14 is configured to receive corresponding display content obtained by the handheld device according to the forward invoking input response message.

Figure 18:
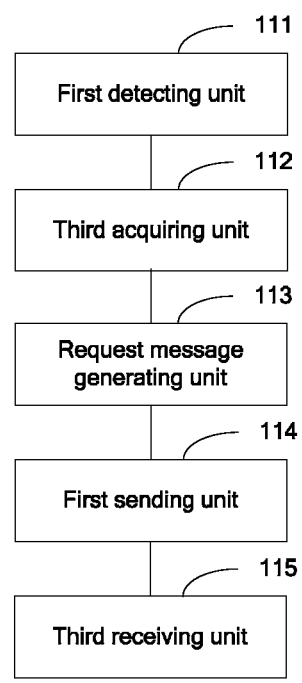
FIG. 18 is a schematic structural diagram of another first acquiring unit according to an embodiment of the present application.

When the set top box invokes the edit box of the handheld device after detecting that the second edit box requires text editing, as shown in FIG. 18, the first acquiring unit may include the following subunits: a first detecting unit 111, a third acquiring unit 112, a request message generating unit 113, a first sending unit 114, and a third receiving unit 115.

The first detecting unit 111 is configured to detect whether a cursor position is in the second edit box.

The third acquiring unit 112 is configured to acquire information about the second edit box when the cursor position is in the second edit box, where the information about the second edit box includes text display content, the cursor position, and attribute information of the second edit box.

The request message generating unit 113 is configured to generate a backward invoking input request message, where the backward invoking input request message carries the information about the second edit box.

The first sending unit 114 is configured to send the backward invoking input request message to the handheld device, where the backward invoking input request message is used to enable the handheld device to set an attribute of the first edit box according to the information about the second edit box and obtain a backward invoking input response message.

The third receiving unit 115 is configured to receive the backward invoking input response message returned by the handheld device, and receive the display content of the first edit box at the current moment that is sent by the handheld device after the handheld device returns the backward invoking input response message.

The updating unit 2 is configured to update, according to the display content acquired by the first acquiring unit, display content of the second edit box correspondingly displayed by the set top box.

Figure 19:
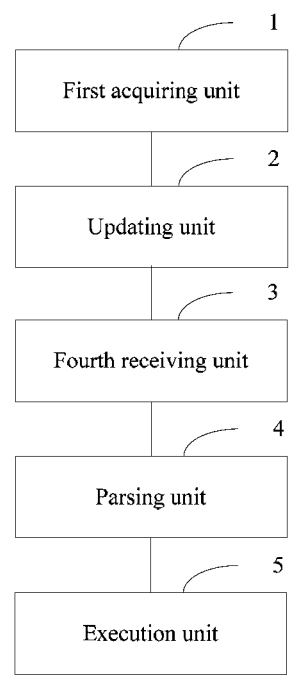
FIG. 19 is a schematic structural diagram of another text information input apparatus according to an embodiment of the present application.

Referring to FIG. 19, FIG. 19 shows another text information input apparatus according to an embodiment of the present application. What is different from FIG. 16 is that a fourth receiving unit 3, a parsing unit 4, and an execution unit 5 are further included. The apparatus includes a first acquiring unit 1, an updating unit 2, the fourth receiving unit 3, the parsing unit 4, and the execution unit 5.

The first acquiring unit 1 is configured to acquire display content sent by a handheld device, where the display content is display content of a first edit box of the handheld device at a current moment.

The updating unit 2 is configured to update, according to the display content, display content of a second edit box correspondingly displayed by a set top box.

The fourth receiving unit 3 is configured to receive an end-of-editing message sent by the handheld device, where the end-of-editing message is generated when the handheld device receives end-of-editing operation information of an operator, and the end-of-editing message carries an executable operation of the set top box.

The parsing unit 4 is configured to parse the end-of-editing message to obtain the executable operation.

The execution unit 5 is configured to execute the executable operation.

In a text information input apparatus provided in this embodiment, a fourth receiving unit receives an end-of-editing message that includes an executable operation and is sent by a handheld device; a parsing unit parses the end-of-editing message to obtain the executable operation, and an execution unit automatically executes the executable operation. Therefore, a user does not need to use a remote controller to manually trigger the set top box to execute a subsequent executable operation, thereby improving intelligence of the set top box.

A person skilled in the art may clearly understand that, the technique in the embodiments of the present application may be implemented through software and a necessary general hardware platform. Based on such an understanding, the technical solutions of the present application essentially or the part contributing to the prior art may be implemented in a form of a software product. The computer software product may be stored in a storage medium, such as a ROM/RAM, a hard disk, or an optical disc, and includes several instructions for instructing a computer device (which may be a personal computer, a server, or a network device) to execute the methods described in the embodiments or some parts of the embodiments of the present application.

The embodiments in this specification are all described in a progressive manner, mutual reference may be made to the same or similar part of the embodiments, and each embodiment focuses on illustrating difference from other embodiments. In particular, for the system embodiment, since it is basically similar to the method embodiment, the apparatus embodiment is described simply, and the relevant part may be obtained with reference to the part of the description of the method embodiment.

The foregoing descriptions are the embodiments of the present application, but are not intended to limit the protection scope of the present application. Any modifications, equivalent substitutions and improvements made within the spirit and principle of the present application shall fall within the protection scope of the present application.

What is claimed is:

1. A text information input method, applied in a handheld device that is used to enable a virtual input method in a set top box, wherein the method comprises:
   sending, by the handheld device, a forward invoking input request message to the set top box to enable the set top box to acquire information about a second edit box displayed by the set top box;
   receiving a forward invoking input response message from the set top box, the forward invoking input response message including the information about the second edit box;
   setting an attribute of the first edit box according to the information about the second edit box;
   invoking the first edit box of the handheld device, wherein the invoking the first edit box of the handheld device comprises:
      receiving a backward invoking input request message sent by the set top box, wherein the backward invoking input request message is a request message generated by the set top box according to information about the second edit box after the set top box acquires the information about the second edit box in response to detecting that a cursor position is in the second edit box, and the information about the second edit box comprises text display content, the cursor position, and attribute information of the second edit box;
      setting the attribute of the first edit box according to the information about the second edit box;
      obtaining a backward invoking input response message; and sending the backward invoking input response message to the set top box;

acquiring an editing operation of text editing performed by an operator on the first edit box;

updating a display content of the first edit box according to the editing operation, wherein the display content comprises text information and cursor position information that are displayed in the first edit box; and detecting whether a first display content of the first edit box at a current moment and a second display content of the first edit box at a previous moment are the same, and if they are different, sending the first display content to the set top box to enable content of the second edit box correspondingly displayed by the set top box to be updated.

2. The method according to claim 1, further comprising:

generating an end-of-editing message according to end-of-editing operation information of the operator, wherein the end-of-editing message carries information about an executable operation of the set top box; and sending the end-of-editing message to the set top box, wherein the end-of-editing message is used to enable the set top box to obtain the information about the executable operation and execute the executable operation.

3. The method according to claim 1, wherein the detecting whether the first display content of the first edit box at the current moment and the second display content of the first edit box at the previous moment are the same comprises:

acquiring the first display content that is displayed in the first edit box at the current moment, wherein the first display content comprises first text information and a first cursor position; and determining whether the first display content and the second display content that is displayed in the first edit box at the previous moment are the same, wherein the second display content comprises second text information and a second cursor position, and if the first text information and the second text information are the same and the first cursor position and the second cursor position are the same, it is determined that the first display content and the second display content are the same; if the first text information and the second text information are different and/or the first cursor position and the second cursor position are different, it is determined that the first display content and the second display content are different.

4. The method according to claim 1, further comprising enabling the virtual input method of the set top box by:

establishing a wireless communication channel between the handheld device and the set top box;

generating an enabling message according to operation information about enabling virtual input, and sending the enabling message to the set top box through the wireless communication channel, wherein the enabling message is used to enable the set top box to set the virtual input method to a default input method and obtain an enabling success result; and receiving the enabling success result sent by the set top box, and displaying prompt information that the virtual input is available.

5. The method according to claim 4, further comprising:

generating a disabling message according to operation information about disabling the virtual input, and providing the disabling message for the set top box, wherein the disabling message is used by the set top box to set a system input method of the set top box to the default input method and obtain a disabling success result; and receiving the disabling success result sent by the set top box, and displaying prompt information that the virtual input is unavailable.

6. A text information input method, applied in a set top box in which a virtual input method is enabled, wherein the method comprises:

receiving a forward invoking input request message sent by a handheld device to the set top box;

sending a forward invoking input response message from the set top box, the forward invoking input response message including information about a second edit box displayed by the set top box, wherein the forward invoking input response message is used to enable the handheld device to set an attribute of a first edit box displayed by the handheld device according to the information about the second edit box;

acquiring display content sent by the handheld device, wherein the display content is display content of the first edit box of the handheld device at a current moment; and updating, according to the display content, display content of the second edit box correspondingly displayed by the set top box, wherein the acquiring display content sent by the handheld device comprises:

detecting whether a cursor position is in the second edit box, and if the cursor position is in the second edit box, acquiring information about the second edit box, wherein the information about the second edit box comprises text display content, the cursor position, and attribute information of the second edit box;

generating a backward invoking input request message that carries the information about the second edit box, and sending the backward invoking input request message to the handheld device, wherein the backward invoking input request message is used to enable the handheld device to set the attribute of the first edit box according to the information about the second edit box and to obtain a backward invoking input response message; and receiving the display content of the first edit box at the current moment that is sent by the handheld device when the handheld device returns the backward invoking input response message.

7. The method according to claim 6, further comprising:

receiving an end-of-editing message sent by the handheld device, wherein the end-of-editing message is generated when the handheld device receives end-of-editing operation information of an operator, and the end-of-editing message carries an executable operation of the set top box; and parsing the end-of-editing message to obtain the executable operation, and executing the executable operation.

8. The method according to claim 6, wherein a process of enabling the virtual input method of the set top box comprises:

establishing a wireless communication channel between the set top box and the handheld device according to a connection request sent by the handheld device;

receiving an enabling message that is used to enable the virtual input method and sent by the handheld device through the wireless communication channel; and setting the virtual input method to a default input method according to the enabling message, obtaining an enabling success result, and returning the enabling success result to the handheld device to enable the handheld device to display prompt information that virtual input is available.

9. The method according to claim 8, further comprising:
receiving a disabling message generated by the handheld device according to operation information about disabling the virtual input; and
setting a system input method of the set top box to the default input method according to the disabling message, obtaining a disabling success result, and sending the disabling success result to the handheld device, so that the handheld device displays prompt information that the virtual input is unavailable.

10. A text information input apparatus, comprising a processor and a non-transitory processor-readable medium having processor-executable instructions stored thereon, the processor-executable instructions including a plurality of units, the units including:
a first sending unit, configured to send a forward invoking input request message to a set top box to enable the set top box to acquire information about a second edit box displayed by the set top box;
a first receiving unit configured to receive a forward invoking input response message from the set top box, the forward invoking input response message including the information about the second edit box;
a first setting unit configured to set an attribute of a first edit box displayed by the text information input apparatus according to the information about the second edit box;
an invoking unit, configured to invoke the first edit box; wherein the invoking unit comprises:
  a second receiving unit, configured to receive a backward invoking input request message sent by the set top box, wherein the backward invoking input request message is a request message generated by the set top box according to information about the second edit box after the set top box acquires the information about the second edit box in response to detecting that a cursor position is in the second edit box, and the information about the second edit box comprises text display content, the cursor position, and attribute information of the second edit box;
  a second setting unit, configured to set the attribute of the first edit box according to the information about the second edit box and to obtain a backward invoking input response message; and
  a second sending unit, configured to send the backward invoking input response message to the set top box;
a first acquiring unit, configured to acquire an editing operation of text editing performed by an operator on the first edit box;
an updating unit, configured to update display content of the first edit box according to the editing operation;
a first detecting unit, configured to detect whether first display content of the first edit box at a current moment and second display content of the first edit box at a previous moment are the same, wherein the display content comprises text information and cursor position information that are displayed in the first edit box; and
a third sending unit, configured to send the first display content to the set top box when the first display content of the first edit box at the current moment and the second display content of the first edit box at the previous moment are different to enable content of the second edit box correspondingly displayed by the set top box to be updated.

11. The apparatus according to claim 10, further comprising:
a third receiving unit, configured to receive end-of-editing operation information of an operator;
a first message generating unit, configured to generate an end-of-editing message according to the end-of-editing operation information, wherein the end-of-editing message carries an executable operation of the set top box; and
a fourth sending unit, configured to send the end-of-editing message to the set top box, wherein the end-of-editing message is used to enable the set top box to obtain information about the executable operation and execute the executable operation.

12. A text information input apparatus, comprising a processor and a non-transitory processor-readable medium having processor-executable instructions stored thereon, the processor-executable instructions including a plurality of units, the units including:
a first receiving unit configured to receive a forward invoking input request message sent by a handheld device to the text information input apparatus;
a sending unit configured to send a forward invoking input response message, the forward invoking input response message including information about a second edit box displayed by the text information input apparatus, wherein the forward invoking input response message is used to enable the handheld device to set an attribute of a first edit box displayed by the handheld device according to the information about the second edit box;
a first acquiring unit, configured to acquire display content sent by the handheld device, wherein the display content is display content of the first edit box of the handheld device at a current moment; and
an updating unit, configured to update, according to the display content, display content in the second edit box correspondingly displayed by the set top box, wherein the first acquiring unit comprises:
a first detecting unit, configured to detect whether a cursor position is in the second edit box;
a second acquiring unit, configured to acquire information about the second edit box when the cursor position is in the second edit box, wherein the information about the second edit box comprises text display content, the cursor position, and attribute information of the second edit box;
a request message generating unit, configured to generate a backward invoking input request message, wherein the backward invoking input request message carries the information about the second edit box;
a second sending unit, configured to send the backward invoking input request message to the handheld device, wherein the backward invoking input request message is used to enable the handheld device to set the attribute of the first edit box according to the information about the second edit box and to obtain a backward invoking input response message; and
a second receiving unit, configured to receive the display content of the first edit box at the current moment that is sent by the handheld device when the handheld device returns the backward invoking input response message.

13. The apparatus according to claim 12, further comprising:
- a third receiving unit, configured to receive an end-of-editing message sent by the handheld device, wherein the end-of-editing message is generated when the handheld device receives end-of-editing operation information of an operator, and the end-of-editing message carries an executable operation of the set top box;
- a parsing unit, configured to parse the end-of-editing message to obtain the executable operation; and
- an execution unit, configured to execute the executable operation.

* * * * *